Figure 1B:
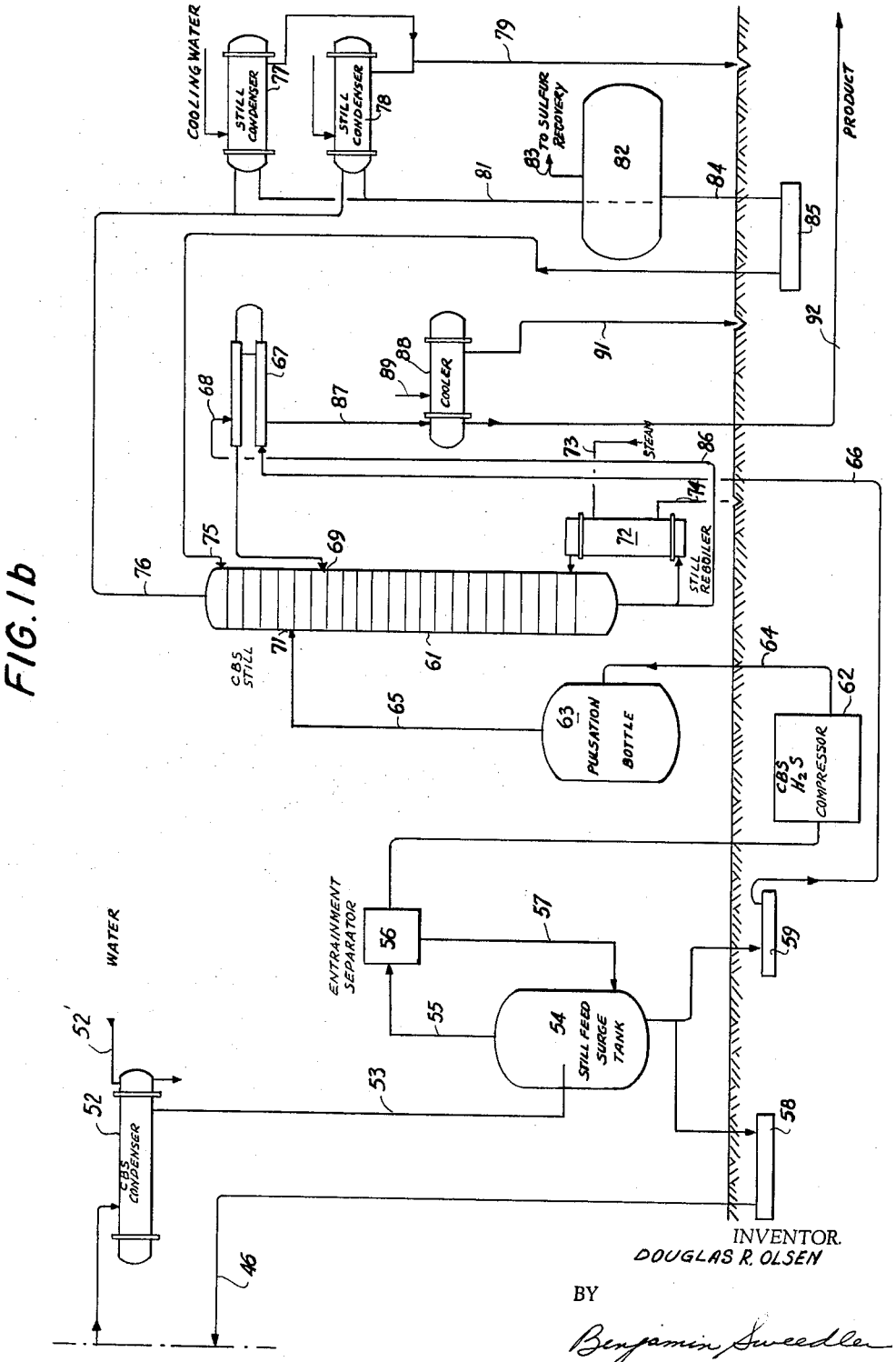

May 10, 1966  D. R. OLSEN  3,250,595
METHOD OF PRODUCING CARBON BISULFIDE
Filed July 12, 1962  2 Sheets-Sheet 1

INVENTOR.
DOUGLAS R. OLSEN
BY
Benjamin Sweedler
ATTORNEY

May 10, 1966          D. R. OLSEN          3,250,595

METHOD OF PRODUCING CARBON BISULFIDE

Filed July 12, 1962          2 Sheets-Sheet 2

INVENTOR.
DOUGLAS R. OLSEN
BY
Benjamin Sweedler
ATTORNEY 3,250,595
METHOD OF PRODUCING CARBON BISULFIDE
Douglas R. Olsen, Staten Island, N.Y., assignor to FMC Corporation, New York, N.Y., a corporation of Delaware
Filed July 12, 1962, Ser. No. 209,425
5 Claims. (Cl. 23—206)

This invention relates to the production of carbon bisulfide by the reaction of sulfur with hydrocarbons and the recovery of the carbon bisulfide from the resultant reaction mixture in substantially pure condition and carried out at relatively low pressures of the order of 175 p.s.i.g. and less, including atmospheric pressure, if so desired.

Both catalytic and non-catalytic processes for reacting sulfur with hydrocarbons, such as the hydrocarbons present in natural gas, methane, ethane, propane and higher hydrocarbons under relatively low pressures have been disclosed; see, for example, United States Patents 2,661,267 granted December 1, 1953 and 2,882,130 granted April 14, 1959. Patent 2,661,267 discloses a low pressure catalytic process involving the introduction of sulfur vapor and hydrocarbon gas into a reactor maintained at a temeprature of 500° to 700° C., employing a catalyst such as silica gel, activated alumina, catalytic clay, natural or synthetic silica-alumina compositions, fuller's earth, alone or with a catalyst promoter such as the oxides and sulfides of a metal of metals of Groups V, VI, VII and VIII of the periodic table, e.g., an oxide or sulfide of iron, vanadium, chromium, molybdenum or manganese. The gaseous reaction products, at a temperature of approximately 230° to 260° C. are cooled to a temperature of 120° to 150° C., scrubbed first with molten sulfur to partially remove the sulfur, then with oil in an effort to complete the removal of sulfur. The relatively sulfur-free gases consisting chiefly of carbon bisulfide and hydrogen sulfide are scrubbed with a carbon bisulfide absorbing oil such as heptane or petroleum naphtha to separate the carbon bisulfide from the hydrogen sulfide. The latter may be charged to a hydrogen sulfide recovery system where the hydrogen sulfide is converted to sulfur for re-use in the process and can be used to manufacture various sulfides or sufuric acid. The oil containing carbon bisulfide is stripped of its carbon bisulfide content by distillation, the carbon bisulfide vapors condensed, redistilled to effect removal of residual hydrogen sulfide and the carbon bisulfide bottoms from the re-distillation fractionally distilled to take off overhead substantially pure carbon bisulfide. It will be noted that the recovery system of U.S. Patent 2,661,267 involves a sulfur scrubber to remove a portion of the sulfur, an oil scrubber to effect removal of residual sulfur, and absorber oil scrubber treatment to separate the carbon bisulfide from the hydrogen sulfide, stripping of the carbon bisulfide from the absorbing oil and fractional distillation of the carbon bisulfide thus separated from the absorbing oil to effect its purification.

U.S. Patent 2,882,130 discloses the reaction of sulfur vapor and hydrocarbon gases in a reaction chamber, including tubular reactors at a temperature of 450° to 700° C. in the absence of a catalyst and at superatmospheric pressures; from 3 to about 7 atmospheres are preferred.

The present invention has as its principal object the improvement and simplification of heretofore known procedures both catalytic and non-catalytic for reacting sulfur vapor with hydracorbon gases, saturated or unsaturated, and recovering substantially pure carbon bisulfide from the reaction mixture, which process is carried out at relatively low pressures, from atmospheric to not exceeding about 175 p.s.i.g., and does not involve the costly and complicated procedures for recovering the carbon bisulfide from the gaseous reaction products, heretofore employed, such as that disclosed, for example, in U.S. Patent 2,661,267.

By carrying out the reaction at relatively low pressures, not exceeding about 175 p.s.i.g. corrosion of the reactor walls, including the stainless steel and chrome, nickel and iron alloy walls, which corrosion invariably takes place at temperatures of 650° to 850° C. required for the high pressure sulfur, hydrocarbon gas reaction is minimized, if not completely eliminated. The elimination of the sulfur scrubber, oil absorber and subsequent stripping of the carbon bisulfide from the absorbing oil medium results in a marked saving not only in equipment costs but in the operation and maintenance expenses. Since the process of this invention employs readily available cooling water, such as mill water, without refrigeration, to effect cooling of the various vapor streams requiring cooling, it results in a marked saving as compared with procedures in which refrigeration equipment must be used to obtain cooling media at the desired low temperature necessary in such prior known procedures for effecting recovery of the carbon bisulfide.

In accordance with this invention, sulfur vapor and hydrocarbon gases, such as methane, ethane, propane, higher hydrocarbons, unsaturated hydrocarbons, and mixtures of such hydrocarbons, for example, natural gas, are reacted catalytically or non-catalytically at a temperature within the range of 450° to 650° C., preferably 500° to 640° C., and under a pressure not exceeding about 175 p.s.i.g. preferably from about 30 to 70 p.s.i.g. The gaseous reaction mixture thus produced under a pressure of from 30 to 70 p.s.i.g., containing unreacted sulfur, carbon bisulfide and hydrogen sulfide, is cooled to a temperature within the range of 150° to 170° C. A portion of the sulfur is thus removed from the gaseous reaction products. The cooled gas stream containing residual sulfur, usually about 2% by weight, carbon bisulfide and hydrogen sulfide, is treated to effect the removal of all of the residual sulfur. This treatment can be effected in any desired manner but preferably involves the introduction of the cooled gas stream into a scrubbing column containing a body of carbon bisulfide and sulfur maintained in a boiling condition in the lower portion of this column. Preferably, the vapor stream is adiabatically cooled to from 90° to 65° C., preferably about 70° C., condensing the residual sulfur in the gas stream by evaporation of carbon bisulfide from the body of liquid material at the base of the scrubber reboiler into which the gas stream is introduced. Liquid is withdrawn from this scrubber reboiler continuously, distilled to separate the sulfur and the residual carbon bisulfide returned to the scrubber reboiler. Vapors in the scrubber reboiler rise and are scrubbed with substantially pure carbon bisulfide introduced into or near the top of this scrubber reboiler. Substantially all sulfur in the vapors is thus removed so that the overhead from the scrubber reboiler is free of sulfur. The substantially pure carbon bisulfide introduced into the top of the scrubber reboiler to effect the scrubbing of the vapors replenishes the body of liquid carbon bisulfide and sulfur maintained in the lower portion of the scrubber reboiler, and into which the cool gas stream containing residual sulfur is introduced, and as above described, adiabatically cooled to effect condensation of the remaining sulfur by the evaporation of carbon bisulfide from the body of liquid in the lower portion of the scrubber reboiler.

The overhead carbon bisulfide and hydrogen sulfide vapor are cooled in a condenser, employing available cooling water, such as mill water, the temperature of which will vary, depending upon atmospheric conditions, and generally is in the range of from 15° C. (winter conditions) to 30° C. (summer conditions). There is thus produced a mixture of carbon bisulfide, chiefly but not entirely in the liquid phase, and hydrogen sulfide vapors. The liquid carbon bisulfide is separated from this mixture and a portion of this carbon bisulfide can be employed to supply the scrubber reboiler with substantially pure carbon bisulfide scrubbing medium. Carbon bisulfide from any other available source can, of course, be used for this purpose.

The vapor stream from which liquid carbon bisulfide has been separated is compressed to a pressure of 165 to 230 p.s.i.g., not exceeding about 300 p.s.i.g., and the compressed mixture without cooling introduced into the fractionating column where separation of the carbon bisulfide from the hydrogen sulfide is effected. By introducing this compressed mixture directly into the fractionating column, without cooling, the heat of compression is employed to aid in the distillation. Thus the steam consumption in this distillation column is reduced. The compressed mixture is introduced into the fractionating column at a point above the introduction of liquid carbon bisulfide obtained upon cooling the overhead from the scrubber reboiler; this liquid carbon bisulfide is desirably preheated by indirect heat exchange with the carbon bisulfide product, removed as bottoms from the still. The overhead vapors containing a small amount of carbon bisulfide and substantially all of the hydrogen sulfide produced in the process pass through one or more condensers, in which cooling is effected by available water at a temperature within the range of 15° to 30° C., such as mill water, without extraneous refrigeration, condensing residual carbon bisulfide in the vapor stream, which condensate is fed to the top of the column to serve as reflux liquid. Hydrogen sulfide vapor can be disposed of in any desired manner, for example, can be treated by conventional techniques to produce sulfur for use in the process.

The accompanying drawing is a flow sheet showing two preferred arrangements of equipment for practicing the process of this invention. FIGURES 1A and 1B placed end to end, as indicated by the dot and dash lines at the right-hand side of FIGURE 1A and the left-hand side of FIGURE 1B, together are a flow sheet of the entire process. FIGURE 2 is a fragmentary illustration of an alternative arrangement of the equipment for effecting the removal of sulfur from the gaseous reaction products, leaving the cooler or sulfur condenser and not involving a sulfur entrainment separator as in the case of the equipment of FIGURE 1A. It will be understood this invention is not limited to the practice of the process in the equipment shown in the drawings, nor is it limited to the particular conditions hereinafter disclosed as representing the preferred conditions of temperature and pressure of the various steps of the process.

Referring first to FIGURE 1A, 10 is a furnace reactor of any conventional type heated by products of combustion generated in the burners 11. The products of combustion flow over the coils or tubes 13, 14, 15 and 16 in the furnace, then give up residual heat to the economizer tubes 17 before exiting through the stack 18. Economizer tube 17 communicates with a drum 19 supplied with feed water 21 which is converted into steam by circulation through coil 17; steam is withdrawn from the economizer drum 19 through line 22.

Hydrocarbon gas, which can be natural gas, methane or any other saturated or unsaturated hydrocarbon gas which will react with sulfur vapor to produce carbon bisulfide, is supplied to the coil 13 through line 23. Sulfur is supplied to this coil through a jacketed line 24 and is vaporized in the coil. The mixture of sulfur vapor and hydrocarbon gas flows through the coil 13 and 14, into and through the reactor 25, thence through the coils 15, 16 into a second reactor 26, reaction taking place, as is well known, as the mixture of hydrocarbon gas and sulfur vapor flows through the coils so that upon exit from reactor 26, maximum or near maximum yields of carbon bisulfide are obtained. Reactors 25 and 26 can contain suitable catalysts for catalyzing the reaction as hereinabove disclosed. Alternatively, these two reactors may be free of catalysts, providing soaking zones which tend to favor substantially complete reaction between the hydrocarbon gas and the sulfur.

If desired, the reactors 25 and 26 can be eliminated and a conventional tubular reactor employed in which the mixture of sulfur vapor and hydrocarbon gas is heated to a temperature within the range of 450° to 630° C.

The reactants are introduced under pressure conditions such that the pressure of the reaction products exiting from reactor 26 does not exceed about 175 p.s.i.g. and can be atmospheric pressure. Preferred pressure is within the range of 30 to 70 p.s.i.g. and preferred temperature of the gases exiting from reactor 26 is within the range of from 500° to 640° C. The reactant proportions are such as to provide an excess of the sulfur over and above that required to react with all of the hydrocarbon to produce carbon bisulfide. As the conditions employed in forming the reaction products consisting of a mixture of carbon bisulfide, hydrogen sulfide and unreacted sulfur are well known, further description of this phase of the process is believed unnecessary.

The gaseous reaction products containing from 2% to 10% sulfur and the rest carbon bisulfide and hydrogen sulfide enter a sulfur condenser or cooler 31 through which water is circulated in indirect heat exchange with the hot gaseous reaction products. The water is thus converted to steam which is taken off through line 32. The reaction products are thus cooled to a temperature within the range of 150–170° C. They flow from the condenser 31 into a sulfur receiver 33 through the jacketed main 34. In receiver 33, separation of liquid sulfur from the gaseous reaction products takes place. The liquid sulfur flows through the jacketed main 35 to a pump 36 from which the liquid sulfur can be pumped through jacketed line 37 for return to the reaction zone in the reactor 10.

The vapors separated from the liquid sulfur invariably contain a small amount of sulfur, about 3% or more, chiefly as entrained liquid sulfur droplets in the gas stream. This gas stream flows through jacketed line 38 into a sulfur entrainment separator 39 which can be in the form of a packed column, a wire mesh blanket, centrifugal separator or other such equipment for effecting separation of the droplets of sulfur entrained in the gas stream. Liquid sulfur thus separated flows through jacketed line 39' into the sulfur receiver 33 from which, as above noted, the liquid sulfur is discharged through main 35 into the pump 36 for return to the reaction zone.

From the sulfur entrainment separator 39 the gaseous reaction products still containing a small amount of sulfur, usually from 1% to 2%, as a non-disentrainable fog, flow through the jacketed line 41 into a scrubber reboiler 42 beneath the level of a body of liquid 43 constituted of liquid carbon bisulfide containing sulfur, usually from 20% to 40% by weight. Scrubber reboiler 42 has its lower or base portion jacketed as at 44, which jacket is provided with a steam line 44'. When starting up, the jacket is supplied with steam to raise the contents of the scrubber reboiler, namely, the body of liquid carbon bisulfide containing some sulfur in the base thereof, to the desired temperature of from 65° to 70° C. Under steady state operating conditions, no steam need be supplied to the base of the scrubber reboiler 42, i.e., to the jacket 44. The reaction products enter at 45' into the body of liquid and bubble up therethrough. The body of liquid is maintained boiling adiabatically by condensation of residual sulfur in the gas stream entering the scrubber reboiler. The heat required for effecting such condensation in turn effects vaporization of carbon bisulfide from the body of liquid at the base of the scrubber reboiler 42. The vapors thus produced rise through the fractionating column 45 constituting the upper portion of the scrubber reboiler 42, where they are scrubbed with substantially pure carbon bisulfide introduced through line 46 into the top of the fractionating section 45. The descending liquid carbon bisulfide thus removes any residual sulfur in the rising stream of vapors and replenishes the body of liquid maintained in the lower portion 43.

Bottoms are withdrawn from the base of the scrubber reboiler 42 through jacketed line 47 and introduced into boiler 48. Here the liquid is vaporized by indirect heat exchange with a suitable heating medium, such as steam, to drive off the carbon bisulfide vapors which are introduced into the base of the fractionating section 45 of the scrubber reboiler 42, through jacketed line 49. Liquid sulfur in boiler 48 is pumped or flows through jacketed line 51 into the sulfur receiver 33, from which it is discharged through line 35 into the pump 36 communicating with the furnace reactor 10.

The overhead from the scrubber reboiler 42, constituted of vapors of carbon bisulfide and hydrogen sulfide free of sulfur, passes through line 51 into a carbon bisulfide condenser 52 supplied with cooling water through line 52′, such as mill water, at a temperature of from 15° to 35° C. In this specification, the reference to mill water is to available cooling water which is not refrigerated. In condenser 52, the major portion of the carbon bisulfide is condensed, e.g., from 70% to 85% of the carbon bisulfide. The mixture of liquid and vapor carbon bisulfide and hydrogen sulfide flows from the condenser 52 through line 53 into a still feed surge tank 54. In tank 54 the liquid carbon bisulfide is separated from the vapors of carbon bisulfide and hydrogen sulfide. These vapors flow through line 55 into an entrainment separator 56 where any entrained liquid carbon bisulfide is removed and returned to tank 54 through line 57. Carbon bisulfide liquid flows from tank 54 into the receivers 58 and 59. Receiver 58 supplies liquid carbon bisulfide to the line 46 which enters near the top of the scrubber reboiler 42 to provide the substantially pure carbon bisulfide employed to scrub the vapors passing upwardly through fractionating section 45 of the scrubber reboiler 42. Receiver 59 supplies the liquid carbon bisulfide fed thereto to the carbon bisulfide still 61, as hereinafter more fully described.

The portion of the carbon bisulfide recovery system thus far described, i.e., comprising the sulfur receiver 33 and associated equipment, the scrubber reboiler 42 and associated equipment, condenser 52 and the still feed surge tank 54, is operated under a pressure of from 30 to 150 p.s.i.g. The mixture of carbon bisulfide vapor and hydrogen sulfide, at a pressure within this range, from the entrainment separator 56 is passed into a compressor 62, where the pressure is increased to from 165 to 300 p.s.i.g. Operating in accordance with this invention, with condensation of the major portion of the carbon bisulfide in condenser 52, a single-stage compressor invariably suffices to handle the pressure elevation.

The mixture of liquid carbon bisulfide, carbon bisulfide vapor and hydrogen sulfide leaving compressor 62 is passed into the pulsation bottle or tank 63 through line 64. Tank 63 communicates through line 65 with the upper portion of the fractionating column 61. The compressed mixture of liquid and vapors is thus delivered to one of the upper plates in the column 61, i.e., a plate removed from the top a distance approximately one-third or one-fourth the height of the plate portion of the column. Thus in the case of a 15 plate column, this mixture is introduced onto the third or fourth plate from the top of the column.

Liquid carbon bisulfide from receiver 59 flows through line 66 through heat exchanger 67 where it is heated by indirect heat exchange with the bottoms from column 61, introduced into heat exchanger 67 through line 68. The heated liquid carbon bisulfide enters column 61 at 69 which, it will be noted from FIGURE 1B, is at a level in the column 61 below 71, the point of introduction of the compressed mixture of vapors and liquid from the pulsation bottle or tank 63 into fractionation column 61. The heated liquid carbon bisulfide is introduced onto a plate which is one or two plates below the plate receiving the compressed mixture at 71, thereby preserving the partial separation of carbon bisulfide and hydrogen sulfide achieved in the condenser 52 and surge tank 54.

The base of still 61 is provided with a reboiler 72 through which carbon bisulfide liquid from the still is recirculated and heated by indirect heat exchange, for example, by steam introduced through line 73. The condensate produced by condensation of the steam in boiler 72 is discharged through line 74 which leads to the sewer. A mixture of carbon bisulfide and hydrogen sulfide reflux liquid is introduced into the top of the fractionating column 61 through a line 75; this mixture, as hereinafter described, is obtained by condensing part of the overhead vapors exiting from fractionating column 61 through line 76.

Vapors from line 76 flow through condensers 77, 78, to which is supplied available cooling water, such as mill water. The water leaving the condensers flows through line 79 to waste. The vapors leaving fractionating column 61, as shown in FIGURE 1B, flow through the condensers 77 and 78 in parallel.

Any other desired arrangement of condensers can be used, employing available cooling water, not refrigerated, which will effect cooling of the vapor stream to a temperature such that under the pressure conditions used all of the carbon bisulfide is condensed. The mixture of hydrogen sulfide gas and liquid carbon bisulfide and hydrogen sulfide flows from the condensers 77, 78 through a line 81 into the tank 82, where separation of the liquid from the hydrogen sulfide gas takes place. The latter flows through the line 83 to sulfur recovery equipment or to other equipment for utilizing the hydrogen sulfide. The liquid thus separated from the hydrogen sulfide gas flows through line 84 into a receiver 85, which supplies line 75 with the reflux liquid fed to the top of fractionating column 61. This liquid contains from 5% to 15%, preferably about 10%, carbon bisulfide with the balance being hydrogen sulfide.

Bottoms from fractionating column 61, constituting the carbon bisulfide product, are withdrawn through line 86 and, as above described, pass through the heat exchanger 67 in indirect heat exchange relation with the carbon bisulfide flowing through this heat exchanger to the fractionating column 61. From the heat exchanger 67 the cooled carbon bisulfide liquid flows through line 87 into a cooler 88, which cools the liquid carbon bisulfide to a temperature of from 38° to 35° C. This cooler is supplied with available cooling water through line 89; water from cooler 88 is discharged from line 91 to the sewer. The cooled carbon bisulfide product passes from cooler 88 through line 92 to storage.

The equipment following the compressor 62 is maintained under a pressure approximating that at which the compressed mixture leaves the compressor 62 except for such pressure loss as takes place in the flow through the equipment. Suitable valves (not shown) are provided in the product line 92 and line 83 for maintaining the desired pressure within the system and releasing the pressure on the carbon bisulfide product stream and the hydrogen sulfide stream discharged through lines 92 and 83, respectively. To avoid complicating the drawings, such valves, as well as other flow control valves and pumps, have not been shown.

The use of distillation column 61 with the feed of the compressed mixture thereinto on an upper plate, say, the third or fourth plate from the top of a 15-plate column, the feed of liquid carbon bisulfide produced by cooling the stream of carbon bisulfide and hydrogen sulfide to condense a major portion of the carbon bisulfide and employing a portion of the liquid carbon bisulfide thus formed, introduced at 69, say, on the 6th plate from the top of the 15-plate column, and the introduction of reflux carbon bisulfide enriched hydrogen sulfide condensate at the top of the column obtained by cooling the overhead from this column, results in unusually efficient separation of the carbon bisulfide from the hydrogen sulfide, using less plates and requiring less steam in the reboiler 72. The final removal of carbon bisulfide from the overhead hydrogen sulfide is accomplished in the condensers 77 and 78 and tank 82 at the specified temperatures and pressures. The plates below the point of introduction of the liquid carbon bisulfide at 69 are utilized to strip residual hydrogen sulfide from the carbon bisulfide liquid descending through the column 61, resulting in a product carbon bisulfide, as bottoms, containing only trace amounts of hydrogen sulfide, which can be tolerated for most uses of carbon bisulfide. These trace amounts can readily be removed, if desired, by simply treating the bottoms, removed from distillation column 61, with a small amount of caustic soda followed by a water wash.

In the modification of FIGURE 2 the gaseous reaction mixture leaving sulfur condenser 31 does not pass through a sulfur separator corresponding to sulfur entrainer 39. The stream of carbon bisulfide and hydrogen sulfide vapors containing 2–3% sulfur flows directly through jacketed line 96 into the scrubber reboiler 42 beneath the body of liquid carbon bisulfide and sulfur maintained boiling adiabatically in the base of the scrubber reboiler 42. However in this modification the height of the packed section of scrubber 45 is made substantially higher, say about three feet or more; the increased height serves to scrub all of the residual sulfur from the rising vapors. Carbon bisulfide and sulfur is withdrawn periodically or continuously from the body thereof in scrubber reboiler 42 through line 95; thus excessive build-up of sulfur in the scrubber reboiler is prevented. The sulfur-carbon bisulfide thus withdrawn can be introduced into the reactors by addition to the sulfur feed to the reaction furnace, if desired. The operation of the scrubber reboiler is substantially the same as described above and the parts thereof are identified by the same reference characters.

It will be understood that all streams referred to flow continuously through the equipment. Still feed surge tank 54 and pulsation bottle 63 are provided to insure such continuous flow and to prevent surges which would otherwise take place because of non-uniform delivery to tank 54 from condenser 52 associated with the scrubber reboiler 42 or to tank 63 from the compressor 62.

The following example is given for illustrative purposes, carried out in equipment such as shown in FIGURES 1A and 1B. It will be appreciated the invention is not limited to this example. In the example which follows the values are given in pounds per hour, temperatures in degrees C.

This example involves the feed of approximately 9000 pounds of sulfur at a temperature of 150° C., and the feed of 1100 pounds of methane into the tubular reactor. The reaction temperature was about 600° C., and the pressure about 68 p.s.i.g. The gaseous reaction products in amount of 10,100 pounds at a temperature of 630° C. and pressure of 67 p.s.i.g. were introduced into sulfur condenser 31 supplied with 2580 pounds of feed water which was converted into stream at a pressure of 50 p.s.i.g. 10,100 pounds of reaction product exit from condenser 31 at a temperature of 160° C. and a pressure of 66 p.s.i.g. and were introduced into the sulfur receiver 33. 740 pounds of sulfur were recovered in this receiver, representing the sulfur fed thereto from the sulfur separator 39, boiler 48 and separated therein from the stream of sulfur and vapor supplied thereto through line 34. 10,300 pounds of carbon bisulfide and hydrogen sulfide vapor under a pressure of 68 p.s.i.g., at a temperature of 160° C., containing approximately 2% sulfur was introduced in the body of liquid maintained in the scrubber reboiler 42, into the jacket 44 of which was introduced steam under pressure of 50 p.s.i.g. There was taken off overhead 11,600 pounds of a mixture of carbon bisulfide and hydrogen sulfide under a pressure of 63 p.s.i.g. and a temperature of 79° C., the temperature at the top of the fractionating column 45. These vapors were cooled in condenser 52 to a temperature of 38° C. and the cooled mixture fed to the surge tank 54. 1500 pounds of carbon bisulfide, at a temperature of 38° C., was removed from surge tank 54.

5,500 pounds of vapor at a pressure of 60 p.s.i.g. and a temperature of 38° C., consisting of carbon bisulfide and hydrogen sulfide, passed through the entrainment separator 56 and thence into compressor 62 where the pressure of the gas stream was increased to 300 p.s.i.g. The temperature of the compressed mixture leaving the compressor was 153° C. This compressed stream, in amount of approximately 5,550 pounds, was introduced onto the third plate of fractionating column 61, a 15-plate column, at a temperature of 153° C.

About 4000 pounds of carbon bisulfide were pumped, under pressure of about 300 p.s.i.g., at a temperature of 38° C., from the receiver 59 through the heat exchanger 67. The liquid carbon bisulfide was thus heated to a temperature of 100° C., at which temperature it entered the 6th plate from the top of the fractionating column 61.

The vapor stream taken off overhead in amount of 9500 pounds, at a temperature of 38° C. and a pressure of 300 p.s.i.g., was passed through condensers 77 and 78. The temperature of this stream was thus reduced to 35° C., at which temperature it entered tank 82. 57,000 pounds of cooling water was employed in effecting cooling and condensation of carbon bisulfide from the overhead vapor stream taken off from fractionating column 61. The carbon bisulfide thus separated from the hydrogen sulfide in amount of about 4900 pounds of carbon bisulfide, at a pressure of 300 p.s.i.g. and a temperature of 35° C., was pumped from receiver 85 into the top of the fractionating column 61.

Approximately 4800 pounds of carbon bisulfide, at a pressure of 300 p.s.i.g., a temperature of 185° C., were removed as bottoms, passed through the heat exchanger 67, and exited therefrom at a temperature of 133° C. This carbon bisulfide product was then passed through the cooler 88, where its temperature was reduced to 35° C.

The present invention, it will be noted, involves complete removal of sulfur from the reaction gases. This enables subsequent compression of the gaseous reaction products without encountering difficulties due to plugging and sulfur deposition in the compressor. The preliminary cooling of the sulfur-free reaction products to effect condensation of the major portion, preferably from 40% to 60% of the carbon bisulfide vapor results in a gaseous stream containing residual carbon bisulfide and hydrogen sulfide which can advantageously be compressed in a single-stage compressor. The heat of compression is advantageously used in aiding in the distillation of the carbon bisulfide and hydrogen sulfide mixture and the carbon bisulfite condensate. Thus heat is conserved in effecting the recovery of the carbon bisulfide. Furthermore by cooling prior to the compression and separating the liquid phase material thus produced from the gas, a liquid phase material is obtained having a relatively lower $H_2S$ content, which can be employed as the scrubbing medium in the scrubber reboiler and also as feed to the fractionating column as hereinabove described to produce as bottoms from this column a carbon bisulfide product containing only trace amounts of hydrogen sulfide.

In that this invention utilizes readily available cooling water, such as mill water, a substantial economy is effected as compared with prior known procedures requiring the use of refrigerated equipment to obtain the necessary low temperatures for effecting condensation of streams containing carbon bisulfide.

It will be further noted that the process of this invention does not require absorbers and strippers such as those utilized in effecting recovery of carbon bisulfide by scrubbing the reaction products with sulfur and oil media and then stripping the absorbing oil to remove the absorbed carbon bisulfide therefrom. Furthermore, in that the present invention is carried out at relatively low pressures, it has the advantages of the saving in power requirements and, equally, if not more important, in the life of the furnace tubes in which the reaction between the sulfur and the hydrocarbon gas is carried out.

This invention is not to be limited by the above disclosure or the showing of the drawings except as indicated in the appended claims.

What is claimed is:

1. In the method of producing carbon bisulfide by reaction of sulfur with a hydrocarbon gas at a temperature of 450° to 650° C. and under a pressure not exceeding about 175 p.s.i.g. to produce a gaseous reaction mixture containing sulfur, carbon bisulfide and hydrogen sulfide, the improved method of separating carbon bisulfide product from the reaction mixture, which comprises:

Step 1, converting said gaseous sulfur to liquid sulfur and removing said liquid sulfur to produce a first gaseous stream substantially entirely consisting of carbon bisulfide and hydrogen sulfide;

Step 2, partially condensing the gaseous carbon bisulfide in said gaseous stream to liquid carbon bisulfide and removing said liquid carbon bisulfide leaving a second gaseous stream of carbon bisulfide and hydrogen sulfide;

Step 3, compressing said second gaseous stream to a pressure not exceeding 300 p.s.i.g. to produce a mixture of liquid carbon bisulfide, carbon bisulfide vapor and hydrogen sulfide vapor, distilling hydrogen sulfide from said mixture and recovering the carbon bisulfide product as bottoms.

2. The method of claim 1 wherein sulfur in the gaseous reaction mixture of sulfur, carbon bisulfide and hydrogen sulfide is converted to liquid sulfur by cooling to 150° to 170° C., and the gaseous carbon bisulfide in the first gaseous stream is partially condensed by cooling with water at 15 to 30° C.

3. The method of claim 1 wherein sulfur in the gaseous reaction mixture of sulfur, carbon bisulfide and hydrogen sulfide is converted to liquid sulfur and removed by cooling said gaseous reaction mixture to 150° to 170° C. and introducing the cooled gaseous reaction mixture into a body of liquid carbon bisulfide and hydrogen sulfide in a scrubbing column and effecting adiabatic vaporization of carbon bisulfide from said body of liquid, passing the gaseous reaction products and the carbon bisulfide vapors thus produced upwardly countercurrent to a descending stream of carbon bisulfide to effect removal of sulfur from the gaseous reaction products, while continuously removing liquid carbon bisulfide and sulfur from the said body of liquid, separating the carbon bisulfide from the sulfur in the liquid thus withdrawn and returning the carbon bisulfide to the scrubbing column; and, the gaseous carbon bisulfide is partially condensed and removed by cooling the overhead carbon bisulfide and hydrogen sulfide vapors from the scrubbing column with cooling water at 15 to 30° C., introducing the mixture of liquid and vapor produced in this step into a separator, separating the liquid and employing at least a portion of said liquid to supply the said scrubbing column with liquid carbon bisulfide.

4. The method of claim 1 wherein sulfur in the gaseous reaction mixture of sulfur, carbon bisulfide and hydrogen sulfide is converted to liquid sulfur and removed by cooling said gaseous reaction mixture to 150° to 170° C. to convert gaseous sulfur to liquid sulfur and passing the cooled gaseous reaction mixture through an entrainment separator to receive entrained sulfur and produce a gaseous stream substantially entirely consisting of carbon bisulfide and hydrogen sulfide, and introducing the cooled gaseous reaction mixture into a body of liquid carbon bisulfide and hydrogen sulfide in a scrubbing column and effecting adiabatic vaporization of carbon bisulfide from said body of liquid, passing the gaseous reaction products and the carbon bisulfide vapors thus produced upwardly countercurrent to a descending stream of carbon bisulfide to effect removal of sulfur from the gaseous reaction products, while continuously removing liquid carbon bisulfide and sulfur from the said body of liquid, separating the carbon bisulfide from the sulfur in the liquid thus withdrawn and returning the carbon bisulfide to the scrubbing column; and, the gaseous carbon bisulfide vapors from the scrubbing column are partially condensed and removed by cooling said vapors from the scrubbing column with cooling water at 15 to 30° C. to produce a mixture of liquid carbon bisulfide and vapors of carbon bisulfide and hydrogen sulfide, introducing the resulting mixture of liquid and vapors into a separator, separating the liquid and employing at least a portion of said liquid to supply the said scrubbing column containing the body of liquid carbon bisulfide and hydrogen sulfide with scrubbing liquid.

5. The method of claim 1 wherein sulfur in the gaseous reaction mixture of sulfur, carbon bisulfide and hydrogen sulfide is converted to liquid sulfur and removed by cooling said gaseous reaction mixture to 150° to 170° C. to convert gaseous sulfur to liquid sulfur, and removing the liquid sulfur from the cooled reaction gases, and passing the cooled reaction gas through a sulfur entrainer separator to separate entrained sulfur droplets and produce a gaseous stream substantially entirely consisting of carbon bisulfide and hydrogen sulfide, introducing the cooled gaseous reaction product produced thereby into a body of boiling liquid carbon bisulfide and hydrogen sulfide in a scrubber column maintained boiling by adiabatic vaporization of carbon bisulfide from said body of liquid, and passing the gaseous reaction products and the carbon bisulfide vapors thus produced upwardly countercurrent to a descending stream of carbon bisulfide to effect removal of sulfur from the gaseous reaction products, while continuously removing liquid carbon bisulfide and sulfur from the boiling body, separating the carbon bisulfide from the sulfur in the liquid thus withdrawn and returning the carbon bisulfide to the scrubbing column; and, gaseous carbon bisulfide in the overhead carbon bisulfide and hydrogen sulfide vapors from the scrubbing column is partially condensed and removed by cooling said vapors with cooling water at 15 to 30° C. to condense carbon bisulfide and produce a mixture of liquid carbon bisulfide, carbon bisulfide vapor and hydrogen sulfide vapor, introducing the mixture of liquid and vapor from this step into a separator, separating the liquid, employing at least a portion of said liquid to supply the said scrubbing column with reflux liquid, and the vapor is compressed to a pressure of from 165 to about 300 p.s.i.g.; and, the distillation is conducted at said pressure of 165 to about 300 p.s.i.g.

References Cited by the Examiner

UNITED STATES PATENTS

| | | | |
|---|---|---|---|
| 2,661,267 | 12/1953 | Folkins et al. | 23—206 |
| 2,882,130 | 4/1959 | Porter | 23—206 |
| 3,079,233 | 2/1963 | Wenzke | 23—206 |

FOREIGN PATENTS 260,236  10/1927  Great Britain.

BENJAMIN HENKIN, *Primary Examiner.*

MAURICE A. BRINDISI, *Examiner.*